April 26, 1960    O. BRETSCHNEIDER ET AL    2,934,423
PROCESS FOR THE THERMAL PRODUCTION OF MAGNESIUM
Filed May 29, 1956
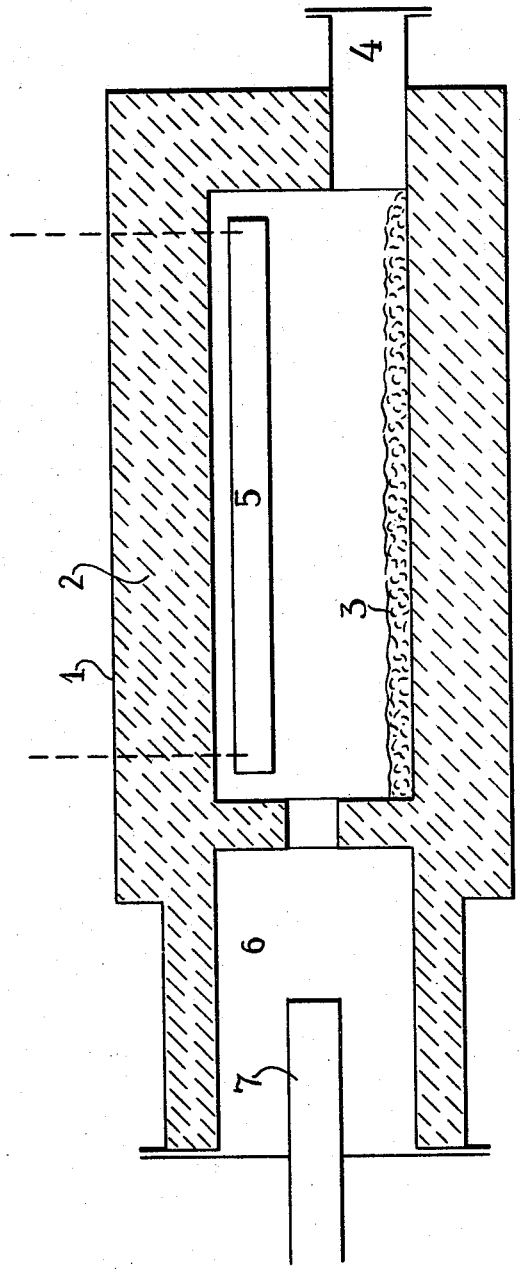
INVENTORS
OTTO BRETSCHNEIDER
BY    FRANZ RODIS
ATTORNEYS

United States Patent Office 2,934,423
Patented Apr. 26, 1960

2,934,423
PROCESS FOR THE THERMAL PRODUCTION OF MAGNESIUM

Otto Bretschneider and Franz Rodis, both of Knapsack, near Koln, Germany, assignors to Knapsack-Griesheim Aktiengesellschaft, Knapsack, near Koln, Germany, a corporation of Germany Application May 29, 1956, Serial No. 587,987

Claims priority, application Germany June 4, 1955

3 Claims. (Cl. 75—67)

This invention relates to a process for the thermal production of magnesium, wherein substances containing magnesium oxide are reacted with reducing agents.

In the known processes for the thermal production of magnesium by reduction of magnesium oxide or substances containing magnesium oxide with reducing agents at a high temperature, all reaction components are previously ground to form a fine powder and are then mixed with one another each in a finely divided form. In most cases this operation is followed by a shaping process to convert the powdery reaction mixture into pressed articles having certain dimensions. Generally, the shaping process is performed since the pulverulent mixture exhibits a pronounced tendency to be converted into dust during the formation of the vaporous magnesium and since the dust conveyed contaminates the resulting condensed magnesium.

When a powdery reaction mixture is used, the formation of magnesium must be interrupted before introducing the material into the reaction furnace to prevent conveyance of the powder during the loading operation. This may be achieved in the case of continuous processes which are operated under reduced pressure by closing the vacuum pump with a valve during the loading of the furnace. After the loading operation has been terminated, the valve to the vacuum pump must be slowly opened to prevent the powder introduced from being carried away by the mascent magnesium vapor. In most cases the pulverulent reaction mixture is previously pressed to form briquets in order to prevent the formation of dust and the briquets are then introduced into the reaction furnace where the vaporous magnesium is formed.

When grinding substances containing magnesium oxide, preferably burned dolomite, atmospheric moisture is rapidly absorbed. Such sensitiveness of the burned dolomite derives from its burning temperature which is kept at a fairly low degree to have a burned material with the desired reactivity. The moisture absorbed by burned dolomite becomes chemically bound and consumes in the reaction furnace equivalent amounts of reducing agent or magnesium vapor. Detrimental to the course of this process is also the simultaneous formation of hydrogen since by the gas thereby evolved the reaction mixture becomes dusty and the condensation of the magnesium vapor becomes defective.

Even with a comminution device of today it is very difficult to grind the burned material without absorption of traces of moisture. Generally, a grinding device is used which partially acts as a fan; in this case, the air duct prevents the material from depositing and brings about the necessary cooling effect. However, grinding devices through which air is passed cannot be used for grinding substances which are sensitive to moisture. For the thermal production of magnesium the burned dolomite must be ground in low power screen mills in the absence of air; however, also in this case it is impossible completely to prevent a slight increase of the content of moisture.

Another difficulty arises in shaping the powdery reaction mixture. The presence of the reducing agent, for example ferrosilicon, involves a considerable abrasion of the pressing tools and thus renders the production of magnesium considerably less economical.

Now we have found that by the process of this invention all disadvantages can be overcome and that grinding of the carefully burned magnesium oxide or a substance containing magnesium oxide and shaping of the entire reaction mixture can be economized whereby it is possible to introduce the material to be reacted free from any subsequently absorbed moisture into the reaction furnace.

As already stated above, the process of this invention relates to the thermal production of magnesium, wherein substances containing magnesium oxide are treated with at least one metallic reducing agent which in addition to magnesium yields no volatile reactive substances, such as ferro-silicon, aluminum, silico-aluminum, calcium silicon or other metallic reducing agents; the burned granular and magnesium oxide-containing substance is subsequently loosely mixed with fine granular substances acting as reducing agent and the resulting reaction mixture is then introduced directly without further comminution into the reaction furnace to undergo conversion into magnesium above the "solidus curve" of the reducing agent.

The term "solidus curve" as used herein is intended to define the temperature limit above which the liquid and solid phase coexist in metal alloys having a different composition.

In carrying out the process of this invention the substance containing magnesium oxide can be used, just as the reducing agent, in stoichiometric quantities, the reaction being interrupted as soon as the reducing agents have been consumed to an extent such that the remaining proportion of reducing substance is insufficient to continue the reduction at the same reaction velocity as at the outset; in other words, the reducing agents are converted to slowly reacting substances; in the case where, for example, 100 kg. of burned dolomite containing 38% of magnesium oxide are used in the presence of 18 kg. of ferro-silicon with a content of silicon of 75% as reducing agent, the silicon content of the residual 6 kg. of ferro-silicon amounts to about 25%; see Example 1.

In the case of a complete reduction of substances containing magnesium oxide, the reducing agents may also be employed in an excess quantity sufficient to convert the metallic accompanying substances of the reaction mixture into slowly reacting substances; thus, for example, in the case where 100 kg. of burned dolomite containing 38% of magnesium oxide are used in the presence of 21.1 kg. of ferro-silicon with a silicon content of 75%, the silicon content of the residual 7.9 kg. of ferro-silicon amounts to 33%; see Example 2.

Alternatively, it is also possible to use the reducing agents in an amount smaller than theoretically required, and to interrupt the reduction as soon as the content of reducing agents retained in the reaction residue has become so small to convert the metallic accompanying substances contained in the reaction mixture into slowly reacting substances; this is the case when, for example, 100 kg. of burned dolomite containing 38% of magnesium oxide are used in the presence of 10 kg. of ferro-silicon with a silicon content of 75% as reducing agent; in this case, half of the burned dolomite used which has not been reacted is separated from the reaction mixture and 3.2 kg. of ferro-silicon with a silicon content of 20% are retained in the reaction residue. Such amount of ferro-silicon is insufficient to exert a reducing effect under the reaction conditions applied; see Example 4.

Still further, it is possible to use the reducing agents in excess quantities and to retain a still reactive amount of reducing agent in the reaction residue which can then be used for further batches. Thus, for example, the reduction of 100 kg. of burned dolomite containing 38% of magnesium oxide with 39.8 kg. of a metal alloy composed of 30% of aluminum, 40% of ferro-silicon and 30% of iron, yields a residue containing 24 kg. of ferro-silicon with a silicon content of 50%; see Example 3.

The process of this invention offers the advantage of enabling a ferro-silicon having a relatively small content of silicon, preferably 40 to 50%, to be employed which is only partially utilized; in this case, however, the reduction is performed in the presence of substances containing fluoride. Thus, for example, 100 kg. of burned dolomite containing 38% of magnesium oxide are reacted with 2.5 kg. of fluorite and 60 kg. of ferro-silicon containing 45% of silicon. The residue after having been worked up contains 46.8 kg. of ferro-silicon with a silicon content of 30%; see Example 5.

The reducing agent can be mixed in lumpy form with the lumpy material containing magnesium oxide and the reaction mixture can then be introduced into the reaction furnace.

Alternatively, it is also possible to mix the reducing agent partly in a most finely divided form and partly in the form of lumps with the lumpy material containing magnesium oxide and then to introduce the reaction mixture into the reaction furnace.

The lumpy material containing magnesium oxide may be used in a grain size from between 0.5 and 20 mm.

The process of this invention involves the further advantage that the alloy which is composed of reducing agent and metallic accompanying substances and retained in the residue can be recovered and re-used.

Following the burning operation the material containing magnesium oxide is mixed with the well comminuted reducing agent and directly introduced into the reaction furnace. It has been found that this mixture, especially at a temperature above 1500° C., exhibits the same reactivity as a pulverulent and shaped reaction mass. The ferro-silicon which adheres to the surface of the substance containing magnesium oxide, for example dolomite grains, gives rise to the formation of an intermediate compound with the chalk, probably calcium silicide and this prior to the formation of magnesium; this intermediate compound is extremely rapidly absorbed by the porous structure of burned dolomite and acts as a strong reducing agent in the interior of the dolomite nucleus.

In order to save expenses for comminuting the ferro-silicon which serves as reducing agent, the compound may also be used partly in the form of fine grains and partly in the form of lumps.

The idea underlying this invention also resides in that the magnesium oxide or the material containing magnesium oxide is used in lumps, preferably in the form of grains having a diameter of 0.5 to 20 mm., and/or in the form of a mixture thereof, both during burning and the subsequent conversion into magnesium which is achieved above the "solidus curve" of the reducing agent; the reducing agent, for example ferro-silicon, aluminum, silico-aluminum or other metals, is loosely mixed in the form of a powder with the lumpy magnesium oxide or the material containing magnesium oxide, and the reaction mixture so obtained is then introduced into the reaction furnace.

Alternatively, the reducing agent can be mixed in the form of lumps with lumpy magnesium oxide or a substance containing magnesium oxide and the reaction mixture can then be introduced into the reaction furnace.

On the other hand, it is possible to mix the reducing agent partly in a finely divided or pulverulent form and partly in lumpy form with lumpy magnesium oxide or a substance containing magnesium oxide, and then to introduce the mixture obtained into the reaction furnace.

In addition to the advantages described above, the process of this invention may involve a considerable economization of energy by mixing the burned material immediately after having left the reaction furnace in the hot or incandescent state with the reducing agent and introducing the resulting pre-heated reaction mixture into the magnesium furnace. Such economization of energy is noteworthy since a mixture may be composed, for example, of 70 weight percent of dolomite, so that the energy economized, calculated upon the entire magnesium process, in this case may be as high as about 20%.

The process of this invention may be carried out in a manner such that in a complete reduction of substances containing magnesium oxide the reducing agents are used at least in an excess quantity higher than theoretically required which suffices to convert the metallic accompanying substances contained in the reaction mixture into slowly reacting alloys or compounds.

The excess quantity of the reducing agent to be employed depends on the nature and quality of the metallic reducing agent used. In carrying out the process of this invention it has proved advantageous to use the component acting as reducing agent in an excess quantity such that the compounds or alloys formed by the accompanying metal which reduce the reactivity of the reducing agent, as for example the compound FeSi in the case where ferro-silicon is used as reducing agent, are retained after the reaction is complete. In this manner the reducing agent which is readily available during the reaction is completely utilized at the highest possible reaction velocity.

The process of this invention may also be carried out in such a way that the reducing agents are used in stoichiometric quantities or in a theoretically insufficient amount so that in relation to the reducing agent the magnesium oxide is present in either an equivalent proportion or an excess. In this case, the reduction is not interrupted until the content of reducing agents retained in the residue suffices to convert the metallic accompanying substances contained in the mixture into slowly reacting alloys or compounds, since the reaction velocity is noticeably reduced.

Still further, the process of this invention can be effected so that ferro-silicon with a low content of silicon, preferably with a silicon content of 40 to 50%, is used which is only partially exhausted for the reduction, the reaction being performed in this case in the presence of substances containing fluoride.

A higher proportion of metal in the reaction mixture favors the thermal conductivity of the mixture, and the better dispersion of the ferro-silicon shortens the time necessary for the diffusion processes which take place during the reaction.

In carrying out the process of this invention it is also possible to recover and re-use the alloy composed of reducing agent and metallic accompanying substances retained in the residue. This may be done with advantage by recovering the reducing agent in excess either magnetically or by wet-mill concentration or in a liquid phase; the reducing agent may be used as such, for example, in the form of ferro-silicon of 25 to 50% strength, or it may be recycled into the reaction furnace to be used for the preparation of high-grade ferro-silicon.

The invention is illustrated by the accompanying diagrammatic drawing which represents a vertical cross section of a muffle furnace suitable for use in carrying out the process of this invention.

The substances containing magnesium oxide are introduced into the muffle furnace through opening 4 together with the reducing agents.

Casing 1 of the furnace is lined with heat insulating material 2 upon which the reaction mixture 3 is spread out. The heat is transferred to the material, for example, via rheostat 5 by radiation.

The magnesium vapor evolved is conveyed to condenser 6 where the metal precipitates on water-cooled pipe 7.

After the reduction, the reacted mixture is removed through opening 4 and the magnesium formed is withdrawn from the furnace by removal of pipe 7. After removal of the material, the furnace can immediately be recharged.

The temperature of the furnace is kept at 1500–1600° C. and the latter is evacuated during the reduction which is complete after about 1 hour, to 1 mm. of mercury by means of a vacuum pump (not shown).

The following examples serve to illustrate the invention but they are not intended to limit it thereto:

Example 1

100 kg. of burned dolomite in the grain size of 1 to 10 mm. containing 38% of magnesium oxide and 18 kg. of fine granular ferro-silicon with a silicon content of 75% are introduced into a muffle furnace in an about 3 mm. thick layer. The ferro-silicon used may have a grain size between 0.2 mm. and the finest commercial size.

An apparatus suitable for use in carrying out the process of this invention is shown diagrammatically in the accompanying drawing. In the drawing, the numerals designate the following parts:

Casing 1 of the furnace is lined with a heat-insulating material 2 carrying expanded mixture 3 which is introduced through opening 4. The heat may be transferred, for example, by radiation through a rheostat 5. The magnesium vapor evolved is conveyed to condenser 6 and the metal precipitates on water-cooled pipe 7. After the reaction is complete, the reaction mixture is removed through opening 4 and the magnesium is withdrawn from the furnace by taking off pipe 7. The furnace may then immediately be recharged.

The temperature is kept between 1500 and 1600° C. During the reaction which lasts for about 1 hour, the furnace is evacuated to about 1 millimeter of mercury. Per charge there are obtained on the cooler 20 kg. of condensed magnesium corresponding to a yield of about 87.5%. A residue of 97 kg. is formed, from which 6 kg. of ferro-silicon containing about 25% of silicon can be recovered by magnetic separation.

Example 2

100 kg. of burned dolomite of a grain size of 1 to 10 mm. containing 38% of magnesium oxide and 21.1 kg. of ferro-silicon with a silicon content of 75% of a grain size of 0.5 to 2 mm. are reacted in vacuo at 1500 to 1600° C. as described in Example 1. On the water cooler precipitate 22.9 kg. of condensed magnesium corresponding to the theoretical yield; a residue of 98.2 kg. is formed, which is molten in an electric arc furnace; 7.9 kg. of ferro-silicon with a silicon content of 33% are recovered in the fusible state.

Example 3

100 kg. of burned dolomite of a grain size of 1 to 10 mm. containing 38% of magnesium oxide and 39.8 kg. of an alloy composed of 30% of aluminum, 40% of silicon and 30% of iron, the alloy having a grain size between 0.5 to 5 mm., are reacted in vacuo at 1400 to 1500° C. as described in Example 1; 22.9 kg. of metallic magnesium corresponding to the theoretical yield are obtained on the water-cooled condenser. A residue of 116.9 kg. of completely reacted substance is obtained; 24 kg. of ferro-silicon with a silicon content of 50% can be recovered by wet-mill concentration through a bumping table.

Example 4

100 kg. of burned dolomite containing 38% of magnesium oxide of a grain diameter of between 1 and 10 mm. and 10 kg. of ferro-silicon with a silicon content of 75% are loosely mixed and then introduced as described in Example 1 into a muffle furnace heated to 1600° C. The ferro-silicon used has a grain size between 0.2 mm. and the finest commercial size. The furnace is evacuated to 1 to 10 millimeter of mercury. The reaction of the mixture is complete within 1 hour yielding 11.4 kg. of condensed magnesium on the cooler. A residue of 98.6 kg. is obtained. After cooling, the dolomite proportion in the residue disintegrates, it has converted into $Ca_2SiO_4$, whereas the dolomite in excess remains behind in the form of coarse grains. 50 kg. of unreacted dolomite grains are recovered by sieving on a sieve having a mesh aperture of 0.5 mm. The residue which has disintegrated to a powder is worked up by wet-mill concentration; 3.2 kg. of ferro-silicon containing 20% of silicon are recovered.

Example 5

100 kg. of burned dolomite of a grain size of 5 to 20 mm. containing 38% of magnesium oxide, 60 kg. of ferro-silicon containing 45% of silicon and having a grain size of 2 to 5 mm., and 2.5 kg. of pulverulent fluorite are introduced as described in Example 1 into a muffle furnace and reacted in vacuo at 1500 to 1600° C. 22.9 kg. of condensed metallic magnesium corresponding to the theoretrical yield are obtained on the cooler. A residue of 139.5 kg. is obtained which is worked up by wet-mill concentration as described in Example 1; 46.8 kg. of ferro-silicon containing 30% of silicon are recovered.

The reaction of a mixture as used in this invention can be carried out in any furnace suitable for he thermal production of magnesium. The process of this invention can be realized both with the use of the known retort method and with the use of a continually or discontinuously operating rotary furnace, shaft furnace or muffle furnace.

The method applied for heating the furnace is not essential in carrying out the process of this invention. It is immaterial whether the mixtures are supplied with energy by means of joulean heat or radiation. Furthermore, the mixture can be reacted under normal and under reduced pressure.

The reaction velocity of a mixture as used herein is superior to that of a powder especially when temperatures are applied which are above the "solidus curve" of the reducing agent or still better above the melting point of the reducing substances.

As compared with the known processes, the process of this invention constitutes a valuable advance in the art since it does not only enable considerable expense to be economized but also allows for the first time of introducing into the process a material to undergo reaction so that no disturbing gases evolve during the formation of magnesium.

We claim:
1. The process of increasing the rate of recovery and yield of magnesium from a porous magnesium oxide-containing substance which comprises the steps of calcining without sintering magnesium oxide-containing substance of a grain size from about 0.5 to 20 mm. in the presence of calcium oxide, mixing said calcined material with a comminuted ferro-silicon reducing agent wherein the silicon content of said reducing agent is from about 40–75% by weight, introducing said mixture in the granular form into a vacuum distillation zone, substantially retaining the heat content of the magnesium oxide-containing substance during the mixing and introduction steps to prevent the formation of impurities within the mixture which are normally formed upon cooling of the oxide-containing substances, immediately heating said introduced mixture to a temperature above the solidifying point of admixed reducing agent, condensing and collecting resulting magnesium vapor while maintaining the temperature of the introduced mixture above the solidifying point of mixed reducing agent, and discontinuing said heating when the silicon content of the heated ferro-silicon reducing agent obtains a value of from about 20-33% by weight.

2. The process of claim 1 wherein a fluoride containing additive is mixed with said calcined material and comminuted reducing agent, said reducing agent having a silicon content from about 40-50% by weight.

3. The process of increasing the rate of recovery and yield of magnesium from a porous magnesium oxide-containing substance which comprises the steps of calcining without sintering magnesium oxide-containing substance of a grain size from about 0.5 to 20 mm. in the presence of calcium oxide, mixing said calcined material with a comminuted ferro-silicon reducing agent wherein the silicon content of said reducing agent is from about 40-75% by weight, introducing said mixture in the granular form into a vacuum distillation zone, substantially retaining the heat content of the magnesium oxide-containing substance during the mixing and introduction steps to prevent the formation of impurities within the mixture which are normally formed upon cooling of the oxide-containing substances, immediately heating said introduced mixture to a temperature above the solidifying point of admixed reducing agent, condensing and collecting resulting magnesium vapor while maintaining the temperature of the introduced mixture above the solidifying point of mixed reducing agent, discontinuing said heating when the silicon content of the heated ferro-silicon reducing agent obtains a value of from about 20-33% by weight, and recovering the ferro-silicon reducing agent from the residual heated mixture.

References Cited in the file of this patent

UNITED STATES PATENTS

| | | |
|---|---|---|
| 1,239,178 | Grosvenor | Sept. 4, 1917 |
| 2,168,750 | Seliger et al. | Aug. 8, 1939 |
| 2,256,161 | Hanawalt et al. | Sept. 16, 1941 |
| 2,370,898 | Whiton et al. | Mar. 6, 1945 |
| 2,387,979 | Cooper | Oct. 30, 1945 |
| 2,398,443 | Munday | Apr. 16, 1946 |

OTHER REFERENCES

Introduction to Metallurgy, Newton, 2nd ed., John Wiley & Sons, page 152, 1948.

Metals Handbook, 1948 ed., page 13.